(12) United States Patent
Cava et al.

(10) Patent No.: US 10,803,641 B2
(45) Date of Patent: Oct. 13, 2020

(54) DERIVATION AND APPLICATION OF COLOR ACCENTS FOR IMAGES IN A VIDEO DELIVERY SYSTEM INTERFACE

(71) Applicant: HULU, LLC, Santa Monica, CA (US)

(72) Inventors: Zachary Cava, Seattle, WA (US); Hansen Smith, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 183 days.

(21) Appl. No.: 15/399,622

(22) Filed: Jan. 5, 2017

(65) Prior Publication Data

US 2018/0189993 A1 Jul. 5, 2018

(51) Int. Cl.
| | |
|---|---|
| *G06T 11/60* | (2006.01) |
| *G06K 9/46* | (2006.01) |
| *G06T 7/90* | (2017.01) |
| *G06T 11/00* | (2006.01) |
| *G06K 9/62* | (2006.01) |

(52) U.S. Cl.
CPC ............ *G06T 11/60* (2013.01); *G06K 9/4652* (2013.01); *G06K 9/4661* (2013.01); *G06K 9/6267* (2013.01); *G06T 7/90* (2017.01); *G06T 11/001* (2013.01)

(58) Field of Classification Search
None
See application file for complete search history.

(56) References Cited

U.S. PATENT DOCUMENTS

| | | | | |
|---|---|---|---|---|
| 5,311,212 A | * | 5/1994 | Beretta | G06F 3/04845 345/591 |
| 2011/0069882 A1 | * | 3/2011 | Hiramatsu | G06K 9/4652 382/165 |
| 2012/0045090 A1 | * | 2/2012 | Bobbitt | G06K 9/00771 382/103 |
| 2013/0266217 A1 | * | 10/2013 | Gershon | G06F 17/3025 382/164 |
| 2014/0359656 A1 | * | 12/2014 | Banica | H04N 21/812 725/32 |
| 2016/0004921 A1 | * | 1/2016 | McCarthy | H04N 19/17 382/173 |
| 2016/0364893 A1 | * | 12/2016 | Howard | H04L 12/18 |

* cited by examiner

*Primary Examiner* — Aaron M Richer
(74) *Attorney, Agent, or Firm* — Fountainhead Law Group PC

(57) ABSTRACT

In one embodiment, a method receives an image of video content for a video offered by a video delivery service. The method analyzes pixels in the image to determine color attributes of the pixels, the color attributes including a lightness attribute and a hue attribute. Lightness counts for the image based on the lightness attribute and hue group counts based on the hue attribute are generated for the pixels. The method selects a lightness classification from lightness classifications based on the lightness counts and selects a hue group from hue groups based on the hue group counts. The lightness classification and the hue group classification are sent to a client device to allow the client device to generate a color using the lightness classification, the hue group classification, and a saturation value, the color being applied to an interface on the client device that is displaying the image.

22 Claims, 6 Drawing Sheets

DERIVATION AND APPLICATION OF COLOR ACCENTS FOR IMAGES IN A VIDEO DELIVERY SYSTEM INTERFACE

BACKGROUND

An application may display different images in a user interface. To provide a pleasing experience to the users, the application may use color accents to bridge the gap between the images and portions of the user interface. For example, depending on the image displayed, certain aspects of the user interface may be adjusted. In one example, for each image a client receives, the client can analyze the image and select which color accents to use for the user interface. This may be convenient because different clients may have different specifications for generating color. However, allowing the clients to perform the analysis when an image is received may provide different experiences for users of different devices. Further, having the client analyze the image when the image is received may be time-consuming and delay the display of the user interface.

DETAILED DESCRIPTION

Described herein are techniques for an image analysis system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate image metadata for images that are going to be displayed on a user interface. The image is analyzed to generate a lightness group classification and a hue group classification based on color attributes of pixels in the image. The lightness group and hue group classifications are then stored for the image as image metadata. When a client device receives a selection from a user in the user interface that causes display of the image, the application can use the image metadata to generate one or more colors (e.g., color accents) that are applied to the user interface. For example, a color is generated based on lightness value and saturation value that are determined based on the lightness group classification and a hue value that is determined based on the hue group classification. If multiple colors are desired, different lightness values and saturation values may be determined based on the lightness group classification and used with the same hue value to generate multiple colors. The generated colors can then be used to accent portions of the user interface when the image is displayed.

Overview

Figure 1:
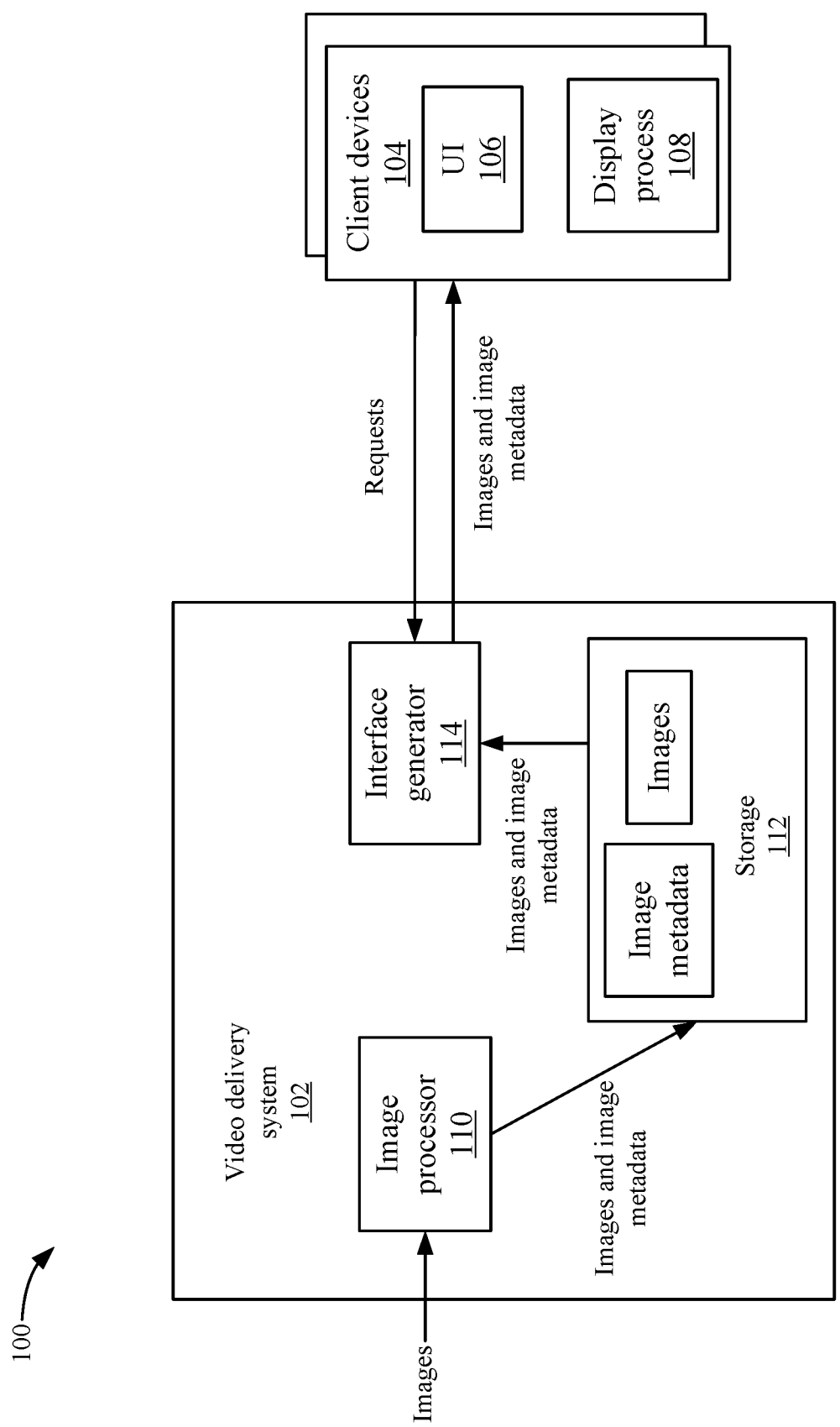
FIG. 1 depicts a simplified system for displaying images with color accents in a user interface 106 according to one embodiment.

FIG. 1 depicts a simplified system 100 for displaying images with color accents in a user interface 106 according to one embodiment. System 100 includes a video delivery system 102 and client devices 104. Video delivery system 102 may deliver videos to client devices 104 via a video delivery service. Client devices 104 may display user interface 106 for an application that allows a user to browse and select videos to play. Because user interface 106 is for a video delivery service, the application may display images from content of the videos on user interface 106. For example, when a user selects a video title, user interface 106 displays an image or a short video clip from the video (e.g., an image from a movie or a scene from the movie). As different images are displayed, the look and feel of user interface 106 may change based on the content of the different images being displayed. Particular embodiments change a color or more than one color that is applied in user interface 106 based on the image currently being displayed.

As a user browses, a display process 108 in client device 104 generates user interface 106. User interface 106 may display different content, such as menus, images, and accent areas. At different times, display process 108 may display different images, such as different images from different videos. An image from the video may be a single image or a series of images (e.g., an animation of multiple images of five seconds, or a short period of video). The different images from the videos may be different in that they may have different color attributes, such as lightness, hue, or saturation. To provide a unified experience to users, display process 108 may generate colors that are used to accent user interface 106. For example, portions of user interface 106 may be generated using colors that are based on the content of the image. These portions may include a selection indicator, a border area, a background area, or other portions of user interface 106. The colors may be applied to user interface 106 in different ways, such as displayed as is on user interface 106 or may be used to generate different colors on user interface 106. Accordingly, as different images are displayed, display process 108 may change the color that is used for portions of user interface 106.

Before client device 104 can display the colors in user interface 106, video delivery system 102 processes the images that will be displayed in user interface 106 to generate image metadata. Then, display process 108 uses that image metadata to generate the colors for the portions of user interface 106 when an image is displayed.

To generate the image metadata, an image processor 110 receives images that could be displayed in user interface 106. For example, the images may be received from videos that are offered in the video delivery service by video delivery system 102. Image processor 110 then analyzes the image to generate color attributes and generates the image metadata from the color attributes. In one embodiment, the image metadata may include a hue classification and a lightness classification for the image. A hue may be a degree representing the color hue to use when generating colors using a HSL (hue, saturation, and lightness or luminosity) representation or HSV (hue, saturation, and value) representation in a RGB (red, green, blue) color model. In one embodiment, a cylinder may represent the HSL or HSV representation. In each cylinder, the angle around a central vertical axis represents the hue, the distance from the axis corresponds to saturation, and the distance along the axis corresponds to lightness or value. For discussion purposes, particular embodiments will use lightness, but lightness could also be derived from the value in HSV. When lightness is used, a person of skill in the art will recognize, the attribute equivalently exists in HSL and HSV representations. In one embodiment, image processor 110 analyzes the pixels to generate the hue classification and the lightness classification, but not the saturation. In one embodiment, the saturation is defined with a lightness value for a lightness classification. The hue classification informs the pure color base that forms the actual visual color. The lightness classification provides an indicator to ensure that colors contrast properly with the images by informing the final saturation/lightness or saturation/value pairs that are used to generate actual colors. Image processor 110 then stores the image metadata in storage 112 for later use when a client device 104 generates user interface 106.

After generating the image metadata, an interface generator 114 receives requests from client device 104 for generating user interface 106. In response, interface generator 114 may send an image to client device 104. Also, interface generator 114 sends the image metadata for the image. As discussed above, the image metadata may include a hue classification and a lightness classification. In one embodiment, only the hue classification and the lightness classification are sent as image metadata and not a saturation value. Further, the red, green, blue, and/or alpha components that make up an RGBA color are not sent to client device 104 in the image metadata. Although RGBA color is described, the alpha component may not be used, and only an RGB color is used. It is noted that the image and image metadata may be sent at different times. For example, the image and image metadata may be sent in real-time in response to a request. In another embodiment, the image metadata may be sent before the request. In other embodiments, the images and image metadata may be downloaded to client device 104 and stored at client device 104.

Display process 108 receives the image and the image metadata and can then generate user interface 106. In generating user interface 106, display process 108 uses the hue classification and lightness classification to generate a color, such as an accent color, for portions of user interface 106, a more detailed process of which will be described below. Display process 108 could generate a single color or multiple colors from the hue classification and lightness classification. Then, display process 108 generates user interface 106, which includes the image and the portions accented with the color. In this case, display process 108 did not analyze the image to generate the red, green, blue, and alpha components of the RGBA color. Rather, display process 108 performed HSL and/or HSV color space transformations using the lightness classification and hue classification to generate the RGBA color to use for the portions.

Image Metadata Generation

Figure 2:
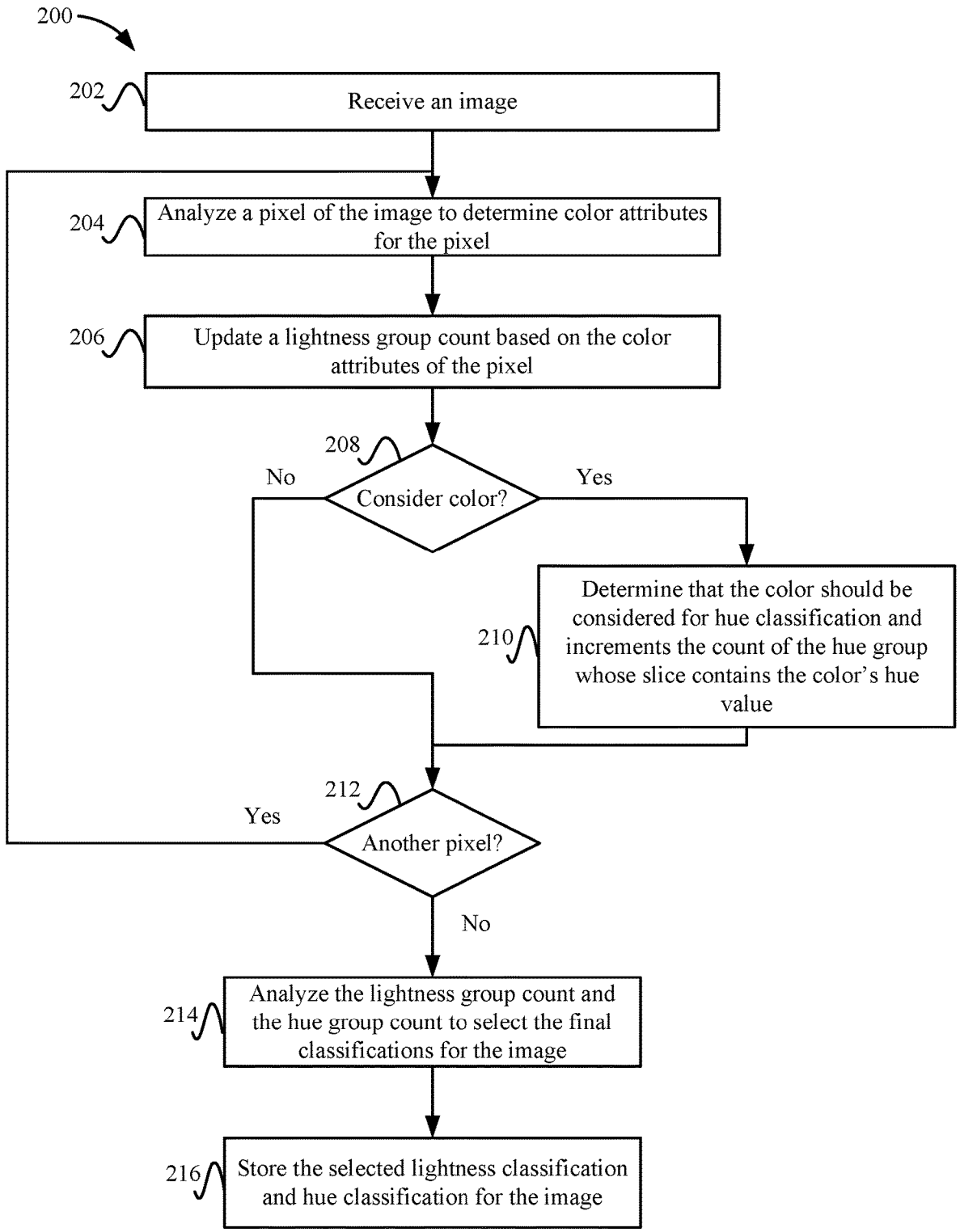
FIG. 2 depicts a simplified flowchart of a method for generating the image metadata according to one embodiment.

FIG. 2 depicts a simplified flowchart 200 of a method for generating the image metadata according to one embodiment. The process described in FIG. 2 may be performed for every image that may be displayed by user interface 106. At 202, image processor 110 receives an image. For example, the image may be received when a new video is received by video delivery system 102 and video delivery system 102 selects an image from the video.

At 204, image processor 110 analyzes a pixel of the image to determine color attributes for the pixel. Although a pixel is described, a group of pixels may be analyzed. Also, in some cases, every pixel of the image may be inspected or just a portion of the pixels. Optimizations of the process will be described in more detail below.

For the pixel, at 206, image processor 110 updates a lightness group count based on the color attributes of the pixel. For example, there may be multiple lightness groups in which the pixel could be classified, such as a dark classification, a medium classification, and a light classification. For the hue group, degree slices of a certain size of hue definitions in the HSL and/or HSV color spaces may be defined, such as a slice size of five degrees. Using a slice size of five degrees means a hue group includes five degrees, such as hue group #10 contains degrees 10 through 14 inclusive and hue group #15 may include degrees 15-19 inclusive. Inclusive means hue group #10 includes degrees 10, 11, 12, 13, and 14. It will be understood that other ranges may be used. In one embodiment, the hue groups may be from 0-360 degrees.

In one embodiment, the process to generate the lightness group and hue group counts may be as follows. First, image processor 110 determines the color attributes as the red, green, blue, and/or alpha components of the pixel that make up an RGBA color. Not all of the RGBA attributes may be determines or other color attributes may also be used. From the RGBA color, image processor 110 derives the hue, chroma, saturation, and/or lightness attributes. In one embodiment, the hue, chroma, saturation, and lightness attributes are as defined by HSL and/or HSV color space transformations. The hue attribute is an attribute of visual sensation where an area appears to be similar to one of red, yellow, green, and blue or to a combination of two of them. The chroma is a colorfulness relative to the brightness of a similarly-illuminated white color. A saturation is the colorfulness of a stimulus relative to its own brightness. The lightness is the brightness relative to the brightness of a similarly-illuminated light.

Image processor 110 may then define light and dark thresholds. For example, the light threshold and the dark threshold may be lightness values. Image processor 110 compares the lightness value to the dark threshold and the light threshold to determine the lightness group classification. For example, if the lightness value is less than or equal to the dark threshold, image processor 110 increments the dark classification for the lightness group. If the lightness value is greater than the dark threshold and less than the light threshold, then image processor 110 increments the medium classification. If the lightness value is greater than or equal to the light threshold, then image processor 110 increments a lightness classification. Although this process is described, other processes may be used to determine the lightness classification.

At 208, image processor 110 then determines if the color should be considered in the hue classification. For example, in some cases, if all pixels were used in the hue classification, then the hue that is determined may not generate a desired color for the portions of user interface 106. Image processor 110 removes pixels with colors that are not considered desirable to use to classify the hue. In one embodiment, image processor 110 determines whether the color should be used using configured color attribute thresholds. In one example, image processor 110 ensures that the chroma falls inclusively within a configured chroma range, ensures saturation falls inclusively within a configured saturation range, ensures lightness falls inclusively within a configured lightness range, and ensures the maximum distance between the R, G, and B components of the color exceeds a configured minimum neutral distance. The neutral distance is the distance a color is from a pure gray. This ensures the color is far enough from gray to not be perceived as one. If all of the thresholds are met for the color (or a portion of them), at 210, then image processor 110 determines that the color should be considered for hue classification and increments the count of the hue group whose slice contains the color's hue value. For example, if the hue is 11°, then the count for hue group #10 is incremented. If the color should not be considered for the hue classification, then image processor 110 does not increment any hue group counts.

Once the lightness group and hue group counts are updated, at 212, image processor 110 determines if another pixel should be analyzed for the image. If so, the process reiterates to 202 where another pixel is inspected.

After all the pixels within the image are inspected, at 214, image processor 110 analyzes the lightness group count and the hue group count to select the final classifications for the image. For example, the lightness count that is the largest is selected as the lightness classification for the image. In this case, the lightness classification for the image could be either light, medium, or dark. The hue classification of the image is the hue of the hue group which count is the largest. In one embodiment, image processor 110 may apply a biasing function to the hue group counts. The biasing function operates on the domain of all possible hue values and returns a multiplier that should be used to manipulate the hue group counts. This function allows for certain parts of the color spectrum to be favored over others to achieve desired results, such as design cohesion, and avoid jarring/displeasing colors. The biasing function may be determined based on the video delivery system's desires in providing the user interface.

At 214, image processor 110 stores the selected lightness classification and hue classification for the image. The image metadata may be stored along with other metadata for later transmission to client devices 104.

In one embodiment, swatch configurations may be used that define swatches. Each swatch may be a color that could be applied to a portion of user interface 106. In one embodiment, each swatch configuration may define three swatches that produce three different colors for each lightness classification. Also, the hue value used may change for each different color. For example, for the light, medium, and dark lightness classifications, image processor 110 defines hue (H), lightness (L), and saturation (S) values. In one example, the values may be:

Light lightness classification: H=X, S=30, L=20;
Medium lightness classification: H=X, S=50, L=40; and
Dark lightness classification: H=X, S=70, L=60.

If multiple colors are generated for one image, then at least one of the hue, saturation, and/or lightness may be varied within a classification to create another color. For example, the medium lightness classification may have a second color of H=X+20, S=50, L=40 or H=X, S=60, L=50, and a third color of H=X+40, S=50, L=40. In one example, when an image is classified with a medium lightness and hue group #10, then three colors are generated as [H=10, S=50, L=40], [H=30, S=50, L=40], and [H=40, S=50, L=40].

In one embodiment, image processor 110 may generate the different hue, saturation, and lightness values for a lightness classification and hue group classification. These values may be generated based on a context, such as characteristics of client devices, or the values may be pre-defined. Video delivery system 102 then sends these values to client devices 104. In another embodiment, client devices 104 may use the lightness classification and hue group classification to generate the different hue, saturation, and lightness values.

Image processor 110 may also use optimizations when analyzing an image. The optimizations may leverage the principle that the exact color of the pixel does not matter; only the hue group it belongs to matters. In content images, such as images from a video, pixels directly adjacent to each other are either the same or slight variations in the majority of cases. Hue group slices are generally large enough to encompass slight variations of adjacent pixels. Pixels adjacent to each other are unlikely to change enough and could be excluded if the previous pixel was excluded. Sudden changes in pixels caused by hard lines in images will contain new segments of similar adjacent pixels. Images composed solely of extreme pixel changes are very unlikely to be chosen as an image by the video delivery system for the application being displayed in user interface 106. Using these observations, image processor 110 can increase performance by only analyzing a subset of pixels instead of every pixel in the image. Image processor 110 may determine the number of pixels that can be skipped based on a function of the size of the hue slice size used to define the hue groups. In one embodiment, every increase of five degrees in the hue groups allows another 100 pixels to be skipped per pixel analyzed. The performance increase from the optimization may produce between five and ten times the performance gain.

Client Processing of Image Metadata

The image metadata may be provided to client devices 104 in different ways. For example, image metadata may be sent to a client device when the client device logs on to the video delivery system. Also, the image metadata may be sent along with the image when requested by client device 104. In one embodiment, the image metadata is sent via a channel from video delivery system 102 to client device 104 that is either used to send the image or is a separate channel.

Figure 3:
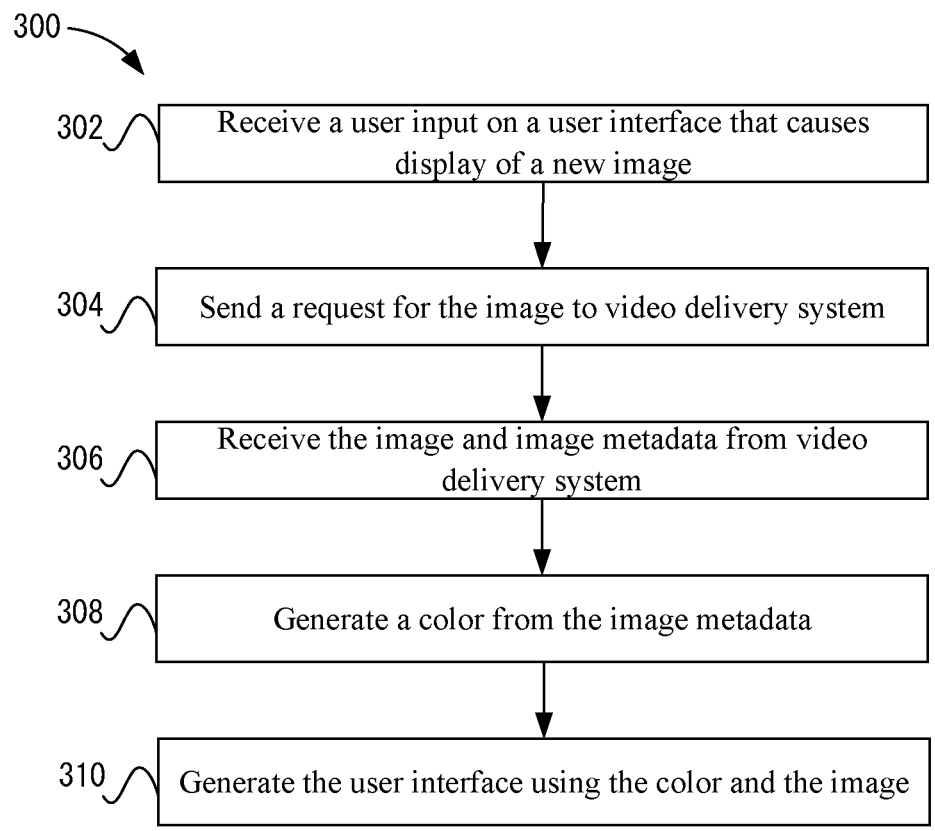
FIG. 3 depicts a simplified flowchart of a method for determining colors to apply to a user interface in conjunction with displaying an image according to one embodiment.

FIG. 3 depicts a simplified flowchart 300 of a method for determining colors to apply to user interface 106 in conjunction with displaying an image according to one embodiment. At 302, display process 108 at a client device 104 receives a user input on user interface 106 that causes display of a new image. For example, a user navigation may select various items on user interface 106. In one example, the items may be different video titles. When a video title is selected, display process 108 will display an image for that video.

At 304, display process 108 sends a request for the image to video delivery system 102. In another embodiment, display process 108 may have received the images already from video delivery system 102 and stored the images in storage on client device 104. In this case, a request for each image does not need to be sent to video delivery system 102.

At 306, display process 108 receives the image and image metadata from video delivery system 102. The image metadata may be received in real-time when the user input is received. Or, the image metadata may be retrieved from storage from client device 104. Also, the image metadata may be automatically sent when an image is requested and client device 104 does not need to request the image metadata separately.

At 308, display process 108 generates a color from the image metadata. A single color will be described, but it is recognized that multiple colors may be generated from the same image metadata. One advantage to providing lightness and hue classifications is that client device 104 can apply different saturation and lightness values to generate multiple colors. If an RGBA color was provided, client device 104 would not be able to directly use that color to generate other colors. Rather, client device 104 would need to convert to the HSV or HSL color space. The process to generate the color or colors will be described in more detail below.

At 310, display process 108 generates user interface 106 using the color and the image. For example, the accent portions of user interface 106 may be colored using the color and the image may be displayed in user interface 106. For example, if a movie is selected, a content image from the movie is displayed in the background of user interface 106 and the color is applied to certain portions of user interface 106. In one embodiment, a selector used to perform the navigation is accented using the color. Other portions of user interface 106, such as the border, may also be accented using the color. Further, the background portion of user interface 106 that is displaying the image may be blended using the color.

Different processes may be used to generate the color or colors. In one embodiment, display process 108 receives swatch configurations. The swatch configurations define different saturation values and lightness values to use for each lightness classification. The swatch configurations could be the same for all clients 104, different for different types of clients 104, or personalized per user. In one embodiment, the swatch configurations may be received and stored at client device 104 at different times. For example, before the request for the image is sent, client device 104 may have already received the swatch configurations via a configuration request or secondary server request. For each swatch configuration, the saturation and lightness values are defined for each lightness classification and are the same for all hues.

The saturation values and lightness values can be combined with the hue classifications for the image to generate one or more colors to be applied to user interface 106. For example, the hue value used may be the base hue classification, such as if the hue classification is hue group #10 for degrees 10-14, then the hue value of 10 is used, but other values could be used within the range (e.g., 11, 12, 13, or 14). Similarly, the hue value of 15 is used when hue group #15 is used because hue group #15 includes the degrees of 15-19 inclusive. Another hue value may also be used within the group if desired. When display process 108 loads an image that has related image metadata for color accenting of user interface 106, display process 108 uses the hue and the swatch configuration appropriate for the lightness classification to create the colors that are applied to user interface 106. In one embodiment, different variations of colors are used to accent user interface 106, but are derived from the same hue classification assigned to the image. In one example, if the hue classification is 170, three color swatches are generated by applying three different sets of saturation values and lightness values to the hue value of 170 to generate three HSL colors. The different colors are then applied to portions of user interface 106. In one embodiment, a first color is used on a first portion of the border of the page and a second color is used on a second portion of the border of the page. A third color may be blended into a background and used to accent the image. The third color may mirror the tone of the image that is used as a background gradient.

Display process 108 may operate in the HSL and/or the HSV color space natively. In this case, RGBA values are not provided from video delivery system 102 to client device 104 for each image. If RGBA values were provided, then multiple RGBA values would have to be provided for each of the different colors used for user interface 106. This may use a lot of bandwidth. Or, a conversion from the RGBA value to the HSL and/or HSV color space would have to be performed, then modifications applied in the HSL and/or HSV color space to create the different colors, and then a conversion back to RGBA would be needed. This conversion may be imprecise due to the nature of the conversions and could cause user interface 106 to look different across client devices 106. Further, depending on how the client is displaying the image, the lightness of the image on the client may need to be analyzed, but clients may not be able to determine the lightness of the image. Accordingly, the only solution if the RGBA space is used might be to send all three RGBA values to client device 104. However, working in the HSL and/or HSV space, only the hue classification and the lightness classification need to be sent using particular embodiments. The swatch configuration includes the lightness values and the saturation values that are needed to generate the colors.

When display process 108 needs to compute the colors to display on user interface 106, display process 108 retrieves the image metadata that was generated by image processor 110 for the image. This includes the lightness classification and hue classification. Then, display process 108 selects the swatch configuration values that are associated with the image metadata. In one embodiment, client device 104 receives the swatch configuration from video delivery system 102. In other embodiments, client device 104 may generate the swatch configuration itself, such as by applying a display context (e.g., a theme) of client device 104 to generate the swatch configuration. Display process 108 selects the saturation value and the lightness value for the lightness classification from the swatch configuration. Then, for each swatch, display process 108 generates a color using the saturation and lightness value and a hue value. In one embodiment, a hue adjustment may be used in one or more of the swatches to adjust the hue value. The hue adjustment changes the hue value used so that different swatches may have different base colors. It is noted that some swatches or none may use the hue adjustment. For example, some swatches may just use different lightness and saturation values with the same hue value. In another example, the same lightness and saturation values are used with different hue values, or all three of the lightness, saturation, and hue values may be different for the swatches. The hue adjustment is a value that may be added to the hue when constructing the HSL and/or HSV color. For example, if the hue adjustment is 80 and the hue value is 50, then the adjusted hue value is 130.

User Interface

Figure 4:
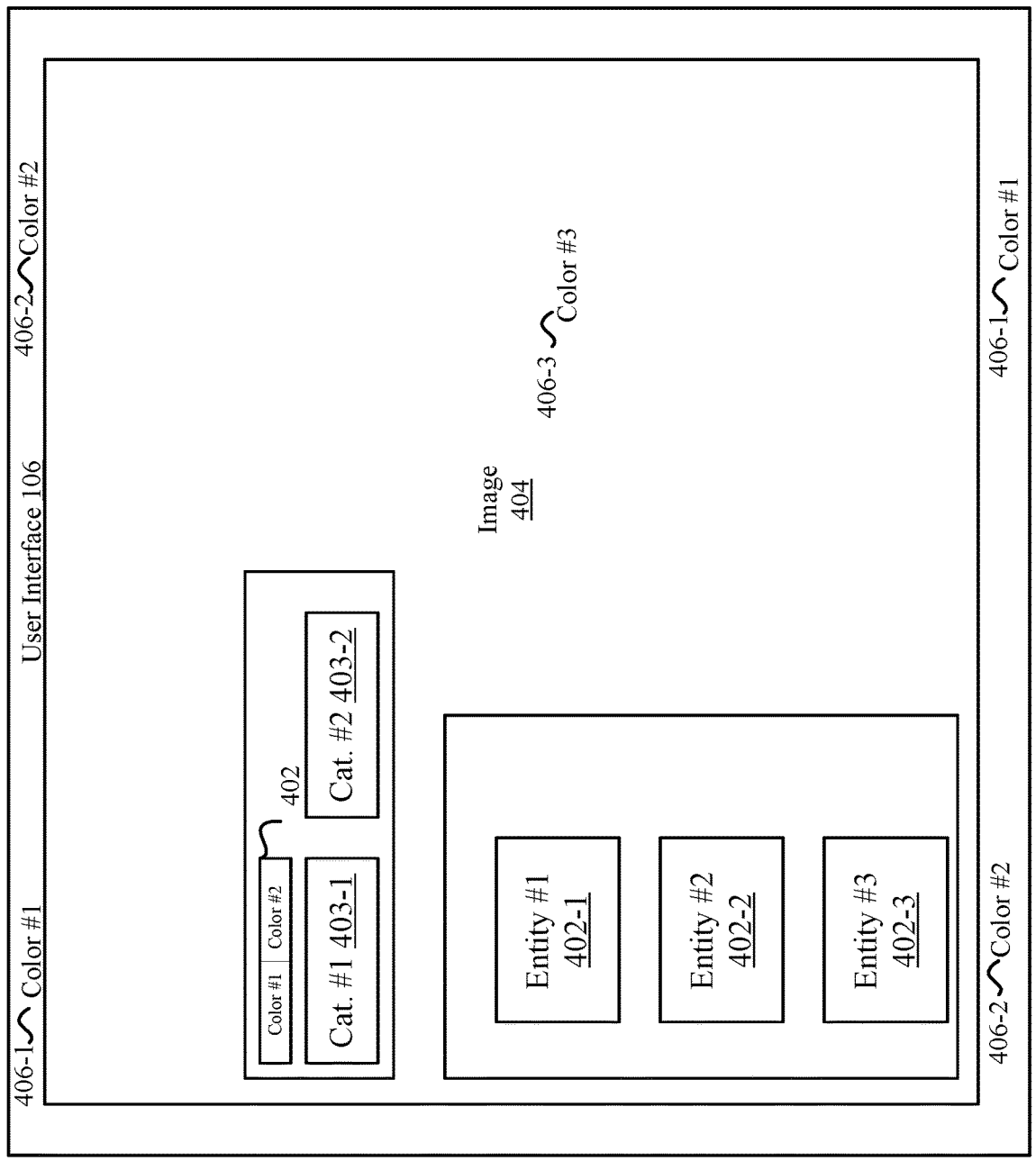
FIG. 4 depicts an example of a user interface according to one embodiment.

FIG. 4 depicts an example of user interface 106 according to one embodiment. On user interface 106, a user may use a selector 402 to select different items displayed on user interface 106. For example, items may include categories, such as category #1 403-1 and category #2 403-2, and also specific items within each category, such as entity #1 402-1, entity #2 402-2, and entity #3 402-3. The categories may categorize items and the entities may be videos that could be requested by the user for playback on user interface 106. When selector 402 is navigated to different items, such as categories and/or videos, an image 404 is displayed on user interface 106, which may be displayed in the background of user interface 106. For example, selector 402 has been used to select entity #1 and an image from the video associated with entity #1 is displayed as the image.

In one embodiment, different portions of user interface 106 are accented with different colors that are generated as described above. As discussed above, a single hue classification is used to generate three different colors. In one example, a first portion 406-1 of user interface 106, such as top left and bottom right border areas, may be accented with a first color #1. A second portion 406-2, such as top right and bottom left border areas, may be accented using a second color #2. Further, a third portion 406-3 may be accented using a color #3. Color #3 may be used to blend the background of the image. Also, selector 402 may be accented, such as color #1 and color #2 may be combined in selector 402. It may be important to accent selector 402 because this is the selector that is used by the user to select different items in user interface 106. Because a different image is being displayed in user interface 106 for different selections of the items, the change in accent color for selector 402 is important to provide a clear indication to the user which item has been selected. Although these portions are described as being accented with these colors, it will be understood that other portions may be highlighted. Also, different combinations of colors may be used in different portions.

Accordingly, particular embodiments provide a process that can select image metadata that can be used to accent user interface 106 that is displaying the image. The process for generating the image metadata may generate a hue classification and light classification that can be sent to client devices 104. This allows client device 104 to not have to analyze the image. Further, the single hue classification and lightness classification for an image can be used by each client device 104 to generate the accent colors to be used in user interface 106. Instead of having to send individual RGBA colors to client device 104, client devices 104 can generate these colors themselves. This may make the display of page 400 to be uniform on multiple client devices 104.

System

Figure 5:
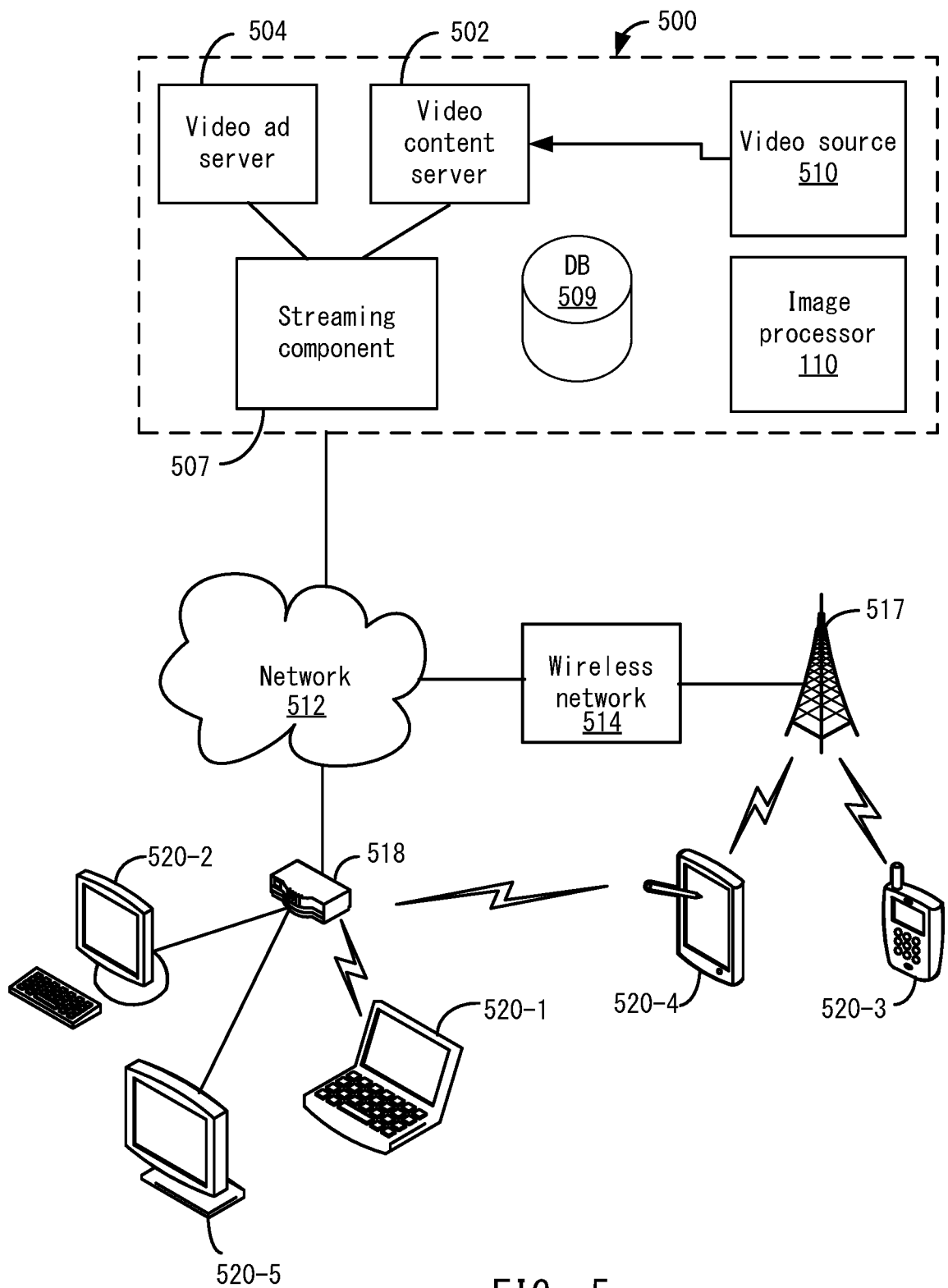
FIG. 5 depicts a video streaming system in communication with multiple client devices via one or more communication networks according to one embodiment.

Features and aspects as disclosed herein may be implemented in conjunction with a video streaming system 500 in communication with multiple client devices via one or more communication networks as shown in FIG. 5. Aspects of the video streaming system 500 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 500, video data may be obtained from one or more sources for example, from a video source 510, for use as input to a video content server 502. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 500 may include one or more computer servers or modules 502, 504, and/or 507 distributed over one or more computers. Each server 502, 504, 507 may include, or may be operatively coupled to, one or more data stores 509, for example databases, indexes, files, or other data structures. A video content server 502 may access a data store (not shown) of various video segments. The video content server 502 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 504 may access a data store of relatively short videos (e.g., 10 second, 30 second, or 50 second video advertisements) configured as advertising for a particular advertiser or message. The advertising may be provided for an advertiser in exchange for payment of some kind, or may comprise a promotional message for the system 500, a public service message, or some other information. The video advertising server 504 may serve the video advertising segments as directed by a user interface controller (not shown).

The video streaming system 500 also may include image processor 110.

The video streaming system 500 may further include an integration and streaming component 507 that integrates video content and video advertising into a streaming video segment. For example, streaming component 507 may be a content server or streaming media server. A controller (not shown) may determine the selection or configuration of advertising in the streaming video based on any suitable algorithm or process. The video streaming system 500 may include other modules or units not depicted in FIG. 5, for example administrative servers, commerce servers, network infrastructure, advertising selection engines, and so forth.

The video streaming system 500 may connect to a data communication network 512. A data communication network 512 may comprise a local area network (LAN), a wide area network (WAN), for example, the Internet, a telephone network, a wireless cellular telecommunications network (WCS) 514, or some combination of these or similar networks.

One or more client devices 520 may be in communication with the video streaming system 500, via the data communication network 512 and/or other network 514. Such client devices may include, for example, one or more laptop computers 520-1, desktop computers 520-2, "smart" mobile phones 520-3, tablet devices 520-4, network-enabled televisions 520-5, or combinations thereof, via a router 518 for a LAN, via a base station 517 for a wireless telephony network 514, or via some other connection. In operation, such client devices 520 may send and receive data or instructions to the system 500, in response to user input received from user input devices or other input. In response, the system 500 may serve video segments and metadata from the data store 509 responsive to selection of media programs to the client devices 520. Client devices 520 may output the video content from the streaming video segment in a media player using a display screen, projector, or other video output device, and receive user input for interacting with the video content.

Distribution of audio-video data may be implemented from streaming component 507 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 507 may communicate with client device 520 using control messages and data messages to adjust to changing network conditions as the video is played. These control messages can include commands for enabling control functions such as fast forward, fast reverse, pausing, or seeking to a particular part of the file at the client.

Since streaming component 507 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 507 may use TCP-based protocols, such as HTTP and Real Time Messaging Protocol (RTMP). Streaming component 507 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 6:
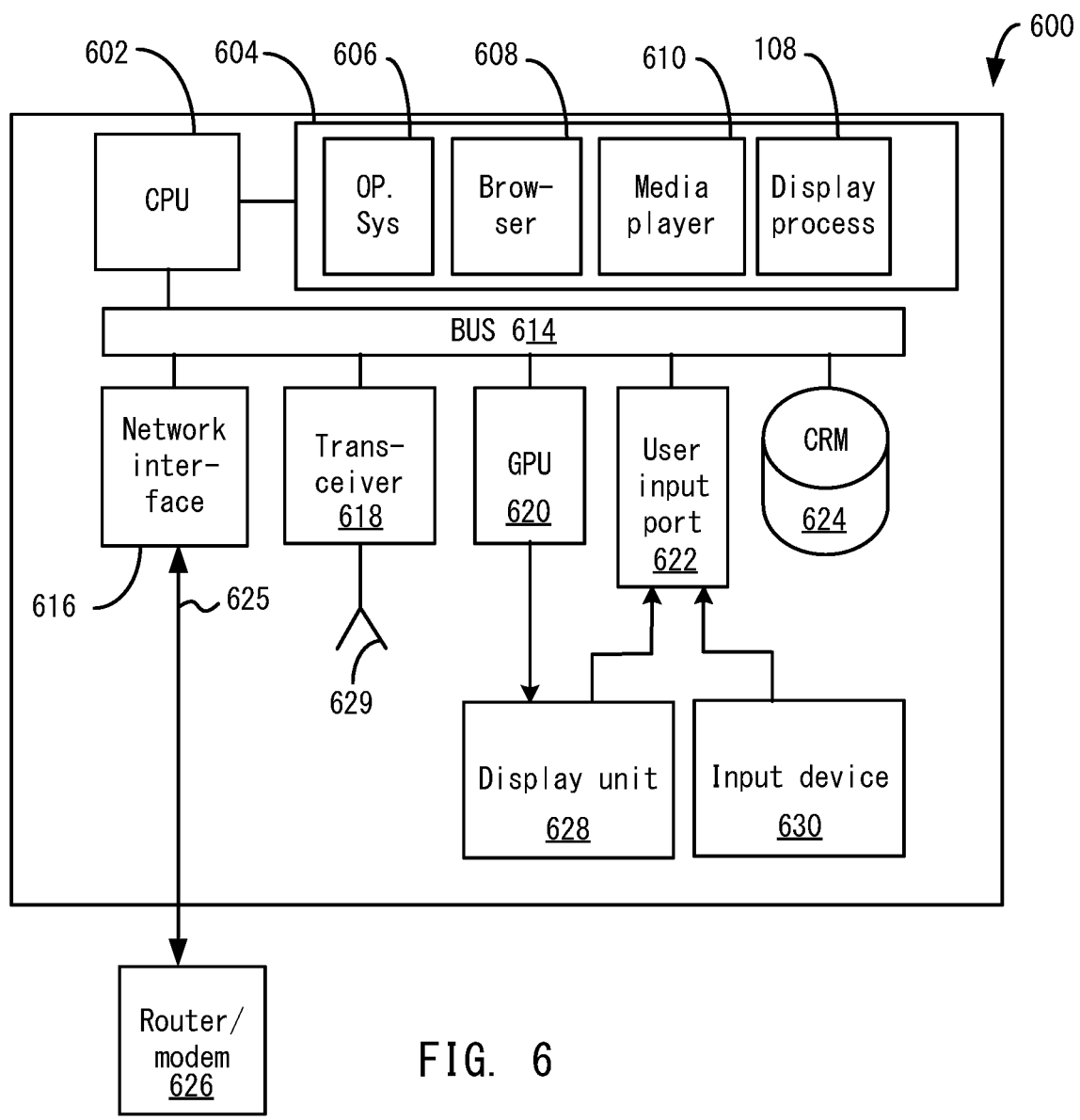
FIG. 6 depicts a diagrammatic view of an apparatus for viewing video content and advertisements.

Referring to FIG. 6, a diagrammatic view of an apparatus 600 for viewing video content and advertisements is illustrated. In selected embodiments, the apparatus 600 may include a processor (CPU) 602 operatively coupled to a processor memory 604, which holds binary-coded functional modules for execution by the processor 602. Such functional modules may include an operating system 606 for handling system functions such as input/output and memory access, a browser 608 to display web pages, and media player 610 for playing video. The modules may further include display process 108. The memory 604 may hold additional modules not shown in FIG. 6, for example modules for performing other operations described elsewhere herein.

A bus 614 or other communication component may support communication of information within the apparatus 600. The processor 602 may be a specialized or dedicated microprocessor configured to perform particular tasks in accordance with the features and aspects disclosed herein by executing machine-readable software code defining the particular tasks. Processor memory 604 (e.g., random access memory (RAM) or other dynamic storage device) may be connected to the bus 614 or directly to the processor 602, and store information and instructions to be executed by a processor 602. The memory 604 may also store temporary variables or other intermediate information during execution of such instructions.

A computer-readable medium (CRM) in a storage device 624 may be connected to the bus 614 and store static information and instructions for the processor 602; for example, the storage device (CRM) 624 may store the modules 606, 608, and 610 when the apparatus 600 is powered off, from which the modules may be loaded into the processor memory 604 when the apparatus 600 is powered up. The storage device 624 may include a non-transitory computer-readable storage medium holding information, instructions, or some combination thereof, for example instructions that when executed by the processor 602, cause the apparatus 600 to be configured to perform one or more operations of a method as described herein.

A communication interface 616 may also be connected to the bus 614. The communication interface 616 may provide or support two-way data communication between the apparatus 600 and one or more external devices, e.g., the streaming system 500, optionally via a router/modem 626 and a wired or wireless connection. In the alternative, or in addition, the apparatus 600 may include a transceiver 618 connected to an antenna 629, through which the apparatus 600 may communicate wirelessly with a base station for a wireless communication system or with the router/modem 626. In the alternative, the apparatus 600 may communicate with a video streaming system 500 via a local area network, virtual private network, or other network. In another alternative, the apparatus 600 may be incorporated as a module or component of the system 500 and communicate with other components via the bus 614 or by some other modality.

The apparatus 600 may be connected (e.g., via the bus 614 and graphics processing unit 620) to a display unit 628. A display 628 may include any suitable configuration for displaying information to an operator of the apparatus 600. For example, a display 628 may include or utilize a liquid crystal display (LCD), touchscreen LCD (e.g., capacitive display), light emitting diode (LED) display, projector, or other display device to present information to a user of the apparatus 600 in a visual display.

One or more input devices 630 (e.g., an alphanumeric keyboard, microphone, keypad, remote controller, game controller, camera or camera array) may be connected to the bus 614 via a user input port 622 to communicate information and commands to the apparatus 600. In selected embodiments, an input device 630 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 628, for example using a touch sensitive screen. A cursor control device may communicate direction information and command selections to the processor 602 and control cursor movement on the display 628. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, an image of video content for a video offered by a video delivery service;
    analyzing, by the computing device, at least a portion of pixels in the image to determine color attributes of the at least the portion of the pixels, the color attributes including a lightness attribute and a hue attribute;
    selecting, by the computing device, a lightness classification from a plurality of lightness classifications based on the lightness attribute and selecting a hue group classification from a plurality of hue group classifications based on the hue attribute;
    storing, by the computing device, the lightness classification and the hue group classification with the image; and
    storing, by the computing device, a plurality of swatch configurations for the plurality of lightness classifications, wherein the plurality of swatch configurations define different saturation values and different lightness values to use for a hue group classification, and wherein the image, the lightness classification, the plurality of swatch configurations, and the hue group classification are sent to a client device to allow the client device to compute a plurality of colors using a selected swatch configuration from the plurality of swatch configurations that is associated with the lightness classification to generate a plurality of combinations for lightness values, saturation values, and hue values by varying at least one of the saturation value defined by the selected swatch configuration, the lightness value defined by the selected swatch configuration, and a hue value defined by the hue group classification without analyzing the image to determine the lightness classification and the hue group classification, the plurality of colors being used to accent one or more accent portions included in an interface that is generated on the client device to display the image.

2. The method of claim 1, further comprising:
    sending the saturation value to the client for use in generating the plurality of colors, wherein the saturation value is pre-defined.

3. The method of claim 1, wherein the swatch configuration defines a plurality of lightness values and a plurality of saturation values for the plurality of lightness classifications, wherein a lightness value and a saturation value are selected by the client device based on the lightness classification received for the image.

4. The method of claim 1, wherein the plurality of swatch configurations are used to generate a plurality of combinations for lightness values, saturation values, and hue values for the lightness classification and the hue group classification for different images.

5. The method of claim 1, further comprising:
    generating a set of lightness counts for the image based on the lightness attribute and a set of hue group counts based on the hue attribute for the at least a portion of the pixels, wherein the lightness classification is determined from the set of lightness counts and the hue group classification is determined from the set of hue group counts.

6. The method of claim 5, wherein generating the set of lightness counts comprises:
    for each pixel in the at least the portion of the pixels, performing:
    determining a lightness value from the lightness attribute for the respective pixel;
    comparing the lightness value to a set of thresholds; and
    incrementing one of the set of lightness counts based on the comparing.

7. The method of claim 6, wherein comparing the lightness value comprises:

when the lightness value is less than or equal to a first threshold, incrementing a first lightness count;

when the lightness value is greater than the first threshold and less than a third threshold, incrementing a second lightness count; and when the lightness value is greater than the third threshold, incrementing a third lightness count.

8. The method of claim 7, wherein:
the first lightness count is a dark classification,
the second lightness count is a medium classification; and
the third lightness count is a light classification.

9. The method of claim 5, wherein generating the set of hue group counts comprises:
for one or more pixels in the at least the portion of the pixels, performing:
determining a hue group in which the hue attribute belongs for the respective pixel; and
incrementing the hue group count for the hue group.

10. The method of claim 6, wherein generating the set of hue group counts comprises:
for one or more pixels in the at least the portion of the pixels, performing:
determining when the respective pixel should not be considered for incrementing any of the set of hue group counts; and
not incrementing any of the set of hue group counts for the respective pixel.

11. The method of claim 10, wherein one or more pixels in the at least the portion of the pixels are not considered for incrementing any of the set of hue group counts when:
a chroma attribute of the respective pixel falls outside of a chroma range;
a saturation attribute of the respective pixel falls outside of a saturation range;
the lightness attribute of the respective pixel falls outside of a lightness range; and
a maximum distance between red, green, and blue components of the respective pixel is within a distance threshold.

12. The method of claim 6, wherein a second portion of pixels of the image are not analyzed and not used to generate the set of lightness counts and set of hue group counts.

13. A non-transitory computer-readable storage medium containing instructions, that when executed, control a computer system to be configured for:
receiving an image of video content for a video offered by a video delivery service;
analyzing at least a portion of pixels in the image to determine color attributes of the at least the portion of the pixels, the color attributes including a lightness attribute and a hue attribute;
selecting a lightness classification from a plurality of lightness classifications based on the lightness attribute and selecting a hue group classification from a plurality of hue group classifications based on the hue attribute;
storing the lightness classification and the hue group classification with the image; and
storing a plurality of swatch configurations for the plurality of lightness classifications, wherein the plurality of swatch configurations define different saturation values and different lightness values to use for a hue group classification, and wherein the image, the lightness classification, the plurality of swatch configurations, and the hue group classification are sent to a client device to allow the client device to compute a plurality of colors using a selected swatch configuration from the plurality of swatch configurations that is associated with the lightness classification to generate a plurality of combinations for lightness values, saturation values, and hue values by varying at least one of the saturation value defined by the selected swatch configuration, the lightness value defined by the selected swatch configuration, and a hue value defined by the hue group classification without analyzing the image to determine the lightness classification and the hue group classification, the plurality of colors being used to accent one or more accent portions included in an interface that is generated on the client device to display the image.

14. The non-transitory computer-readable storage medium of claim 13, further configured for:
sending a swatch configuration that defines a plurality of lightness values and a plurality of saturation values for the plurality of lightness classifications, wherein a lightness value and a saturation value are selected by the client device based on the lightness classification received for the image.

15. The non-transitory computer-readable storage medium of claim 13, further comprising:
generating a set of lightness counts for the image based on the lightness attribute and a set of hue group counts based on the hue attribute for the at least a portion of the pixels, wherein the lightness classification is determined from the set of lightness counts and the hue group classification is determined from the set of hue group counts.

16. The non-transitory computer-readable storage medium of claim 15, wherein generating the set of lightness counts comprises:
for each pixel in the at least the portion of the pixels, performing:
determining a lightness value from the lightness attribute for the respective pixel;
comparing the lightness value to a set of thresholds; and
incrementing one of the set of lightness counts based on the comparing.

17. The non-transitory computer-readable storage medium of claim 15, wherein generating the set of hue group counts comprises:
for each pixel in the at least the portion of the pixels, performing:
determining a hue group in which the hue attribute belongs for the respective pixel; and
incrementing the hue group count for the hue group.

18. A method comprising:
determining, by a computing device, a plurality of swatch configurations that define different saturation values and lightness values to use for a plurality of lightness classifications;
receiving, by the computing device, an image of video content for a video offered by a video delivery service;
receiving, by the computing device, a lightness classification from the plurality of lightness classifications and a hue group classification from a plurality of hue group classifications;
selecting, by the computing device, a swatch configuration from the plurality of swatch configurations, wherein the swatch configuration that defines a plurality of combinations for lightness values, saturation values and hue values for the lightness classification and the hue group classification;
computing, by the computing device, a plurality of colors using the plurality of combinations for lightness values, the plurality of saturation values, and hue values by varying at least one of the saturation value defined by the selected swatch configuration, the lightness value defined by the selected swatch configuration, and a hue value defined by hue group classification without analyzing the image to determine the lightness classification and the hue group classification; and generating, by the computing device, an interface in which the image is displayed, the interface including one or more accent portions that are displayed with different images, wherein the plurality of colors are used to accent the one or more accent portions of the generated interface and the one or more accent portions are accented with different colors when different images are displayed in the interface.

19. The method of claim 18, further comprising:

receiving a navigation to an entity displayed on the interface; and displaying the image and the applied plurality of colors to the interface in response to receiving the navigation.

20. The method of claim 18, further comprising:

using the lightness classification to determine one or more lightness values and one or more saturation values for the plurality of combinations; and using the hue group classification to determine one or more hue values for the plurality of combinations.

21. The method of claim 18, wherein the swatch configuration is received from the video delivery service.

22. The method of claim 18, wherein the plurality of swatch configurations are used to generate a plurality of combinations for lightness values, saturation values, and hue values for the lightness classification and the hue group classification for the different images.

\* \* \* \* \*